(12) United States Patent
Fennel

(10) Patent No.: US 6,192,747 B1
(45) Date of Patent: Feb. 27, 2001

(54) TIRE PRESSURE MONITORING DEVICE

(75) Inventor: Helmut Fennel, Bad Soden (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/029,412

(22) PCT Filed: Jul. 3, 1996

(86) PCT No.: PCT/EP96/02909

§ 371 Date: Sep. 3, 1998

§ 102(e) Date: Sep. 3, 1998

(87) PCT Pub. No.: WO97/09188

PCT Pub. Date: Mar. 13, 1997

(30) Foreign Application Priority Data

Sep. 1, 1995 (DE) .............................................. 195 32 331

(51) Int. Cl.[7] .................................................. B60C 23/02
(52) U.S. Cl. .......................................... 73/146.2; 340/444
(58) Field of Search .............................. 73/146.2; 340/444

(56) References Cited

U.S. PATENT DOCUMENTS

| | | | |
|---|---|---|---|
| 5,546,070 | * | 8/1996 | Ellmann et al. ...................... 340/442 |
| 5,606,122 | * | 2/1997 | Taguchi et al. ...................... 73/146.2 |
| 5,724,266 | * | 3/1998 | Kishimoto et al. ............. 73/146.2 X |

FOREIGN PATENT DOCUMENTS

| | | |
|---|---|---|
| 3236520 | 4/1984 | (DE) . |
| 4228894 | 3/1994 | (DE) . |
| 4303583 | 8/1994 | (DE) . |
| 4426734 | 2/1995 | (DE) . |
| 4337443 | 3/1995 | (DE) . |

OTHER PUBLICATIONS

Patent Abstracts of Japan, vol. 008, No. 032 (M–275) Feb. 10, 1984 (Shin Nippon Denki KK).

* cited by examiner

*Primary Examiner*—Joseph L. Felber
(74) *Attorney, Agent, or Firm*—Rader, Fishman & Grauer PLLC

(57) ABSTRACT

A device for monitoring the tire pressure on the basis of the signals provided by the individual wheel speed sensors includes an electronic evaluating circuit which determines correction factors for the wheel speeds of the individual wheels. The values of the individual correction phases are determined and stored in a learning phase. The deviation of the correction factors from the learnt values is detected and analyzed in an identification phase, and possible loss of tire pressure is signaled. A switch is mounted on the wheel suspension of each vehicle wheel which resets the memories, upon rebound of the wheel until its end position, and re-starts the learning phase for the correction factors.

6 Claims, 1 Drawing Sheet

TIRE PRESSURE MONITORING DEVICE

BACKGROUND OF THE INVENTION

The present invention relates to a system for monitoring the tire pressure in mounted vehicle tires by measuring, comparing and evaluating the rotating speeds of the individual wheels, including wheel speed sensors, and an electronic evaluating circuit which determines correction factors for the wheel speeds of the individual wheels representative of the deviation of the respective wheel speed from a reference quantity, the evaluating circuit determining and storing the values of the individual correction factors in a learning phase, and determining and evaluating the deviation of the instantaneous correction factors in consideration of the respective driving situation in an identification phase, and signaling loss of tire pressure as soon as the deviation of the instantaneous values from the learnt values in consideration of the driving situation exceeds a predetermined amount.

A circuit arrangement of this type is disclosed in German patent application No. 43 37 443. The values for the individual correction factors are determined in the learning period. A band width or tolerance width for the correction factors responsive to the respective driving situation is determined by correlations between the correction factors for typical driving situations. Loss of tire pressure is signaled as soon as it is identified in the identification period that the tolerance width is exceeded.

The loss of tire pressure is identified during driving with the prior art device. The operation of the device is based on the knowledge that the air pressure in the tires influences the tire tread circumference. The dependence on pressure is, however, very insignificant and, therefore, difficult to measure. The wheel speed sensors which are already required in a vehicle (for an anti-lock control system, for example) can now be used to conclude a loss of pressure from the travel measurement and the comparison of the travels covered by the four wheels. Because the changes in circumference of the tires can hardly be resolved, not even in the event of a major pressure loss, the sources of disturbances, more particularly, the different tire diameters due to tire tolerances, tire mixing, different wear, or as a consequence of assembly of an emergency wheel, must be eliminated in the signal analysis. In the prior art tire pressure monitoring device, this is effected by a calibration tip switch which the driver or the workshop personnel is required to operate manually, at least after each tire change. The pressure monitoring system described will subsequently be adjusted in the learning phase to the existing differences in the tire tread circumferences of the individual wheels in response to the distance covered and in consideration of the respective driving situation.

Experience has shown that drivers cannot be expected in each case to reliably operate the calibration tip switch. Therefore, an object of the present invention is to relieve the driver of the obligation of reliably operating the calibration tip switch and to find a most easy way, with least possible effort, to start the learning phase in the necessary intervals or after the occurrence of defined events.

SUMMARY OF THE INVENTION

It has been found that this object can be achieved by a system including that a sensor or switch is provided on the wheel suspension of each vehicle wheel which, upon rebound of the wheel until its final position or beyond a predetermined position, automatically triggers the resetting of the memories, which store the data acquired in the learning phase, and re-start of the learning phase. When required, an additional switch for manually triggering the learning phase can be installed.

Limit switches or travel sensors are already mounted in the spring struts in some automotive vehicle control systems, for example, in suspension control systems. The switches or sensors can also be used as component parts of the device of the present invention. In this case, no, or at least minimum, additional effort is needed in comparison to the state of the art tire pressure monitoring device described hereinabove, and the wanted relief of the driver of operating the calibration tip switch is achieved nevertheless.

If the switches or sensors accommodated in the wheel suspension in the device of the present invention are operated during other maintenance work caused by lifting of the vehicle, this is no disadvantage but enhances the reliability in operation of the tire pressure monitoring device.

Further details of the present invention can be seen in the following description of an embodiment of the present invention making reference to the accompanying drawing.

DETAILED DESCRIPTION OF THE DRAWINGS

Figure 1:
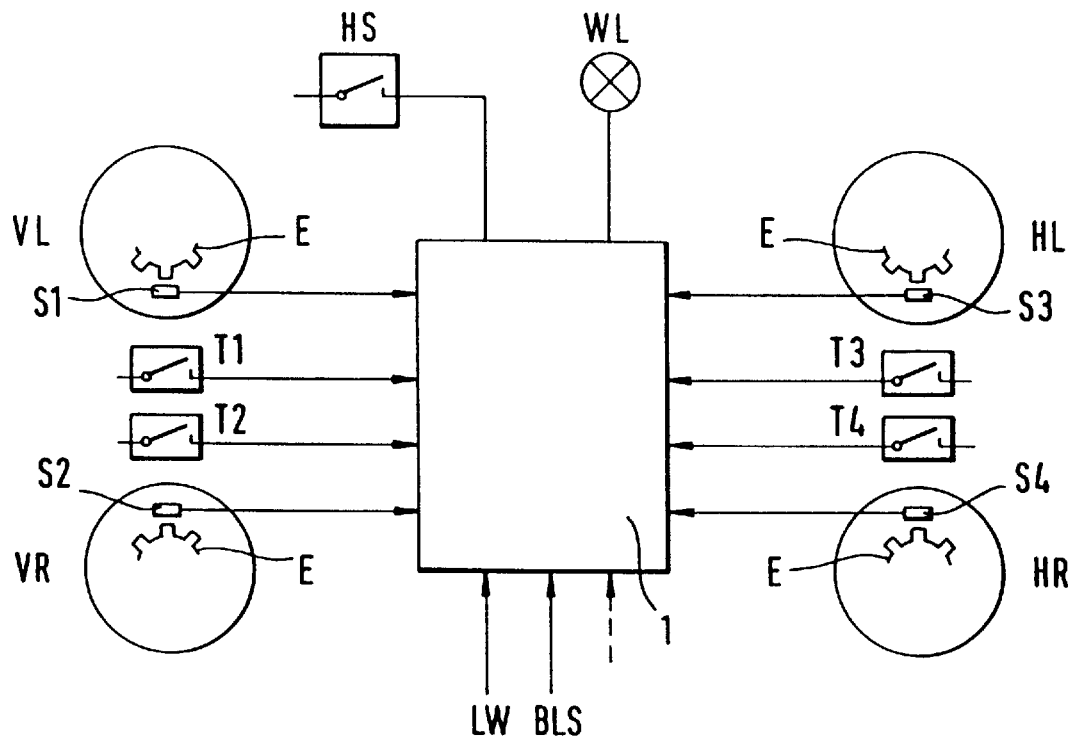
FIG. 1 is a schematically simplified view of the essential component parts of a tire pressure monitoring device according to the present invention.

FIG. 1 shows an automotive vehicle having wheels VL, VR, HL, HR which each include a rotational speed sensor S1, S2, S3, and S4. The sensors are active or passive sensors which are stationarily mounted on the vehicle wheel and send an alternating signal reflecting the wheel rotational speed as soon as the wheel rotates and a toothed disc or an encoder E co-rotating with the wheels. Sensors of this type are known in the art in a great number of design variations. Automotive vehicles including an anti-lock system (ABS), a traction slip control system (TCS) or a driving stability control system (DSC, ASMS) require sensors of this type to produce input quantities for the control.

The output signals of the sensors S1 to S4 are sent to a tire pressure monitoring circuit 1, which comprises the electronic part of the device of the present invention, and processed in this circuit. Circuit 1 can comprise hard-wired circuits and/or programmed circuits. The tire pressure monitoring circuit 1 can also be a component part of the controller of an automotive vehicle control system.

A sensor or switch T1 to T4, which closes or issues a signal as soon as the wheel rebounds until a predetermined position or until the final position, is incorporated in the wheel suspension of each vehicle wheel, i.e., the front wheels VL, VR, and the rear wheels HL, HR. The output signals of the switches T1 to T4 are also sent to the monitoring circuit 1.

The evaluating circuit of the device of FIG. 1, i.e., the tire pressure monitoring device 1, processes, compares and analyzes in a known fashion (for example, according to the method disclosed in the above-mentioned German patent application No. 43 37 443) the signals provided by the rotational speed sensors S1 to S4. Correction factors are produced for each individual wheel, the values of which are calculated in a learning phase step by step in dependence on the driving distance covered. The respective driving situation is found out and taken into consideration in the calculation steps. For example, a direct comparison of the wheel speeds is only possible during straight travel. During cornering, the speeds of the wheels of one axle are naturally different from each other.

The circuit 1 is informed of the steering angle by way of an input LW. Another arrow BLS (brake light switch) and a dotted arrow indicate that the controller suitably includes further sensor signals and analyzes them to judge the respective driving situation.

In an identification phase, the circuit 1 compares the learnt values or correction factors with the actual values and actuates a warning lamp WL as soon as a loss of tire pressure is recognized in the analysis of the present values of the wheel speed sensors S1 to S4.

Figure 2:
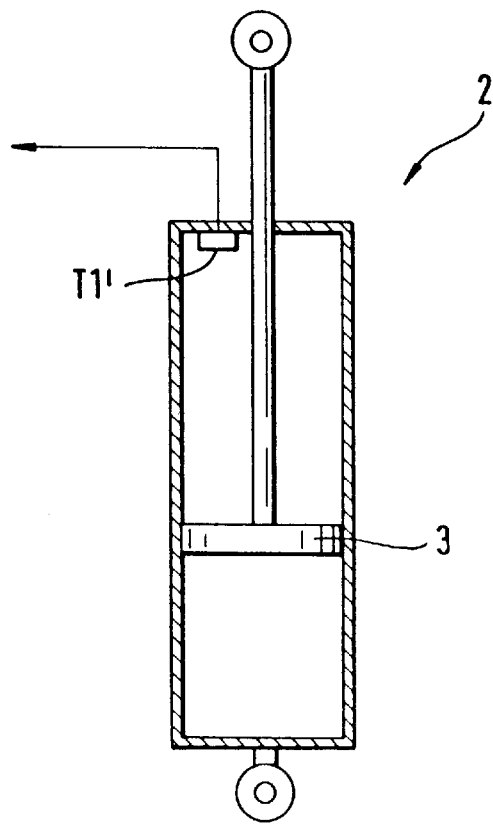
FIG. 2 is a schematic view of a vibration damper including a switch for the device shown in FIG. 1.

FIG. 2 shows an embodiment relating to the installation of a position switch T1' which is accommodated in a vibration damper 2 of the front wheel VL. Upon rebound of the front wheel, as soon as a represented piston 3 in the interior of the vibration damper 2 reaches its top end position, the switch T1' will be actuated mechanically or magnetically so that it signals the rebound of the wheel to the evaluating circuit 1. The signal of one of the limit switches or position switches T1 to T4 is already sufficient to re-start the learning phase of the evaluating circuit 1 of the device of the present invention, and to calibrate the system thereby. Action of the driver or the maintenance staff is not required.

Instead of the position switch T1 to T4, any other switch or sensor which is already provided in the vehicle can be used to indicate the rebound of the vehicle wheel (for example, the switch/sensor used for the suspension control).

An additional manual switch HS is provided in exceptions only.

The switches T1 to T4 are automatically operated whenever the vehicle is lifted by way of a vehicle hoist and during each wheel change, as the wheel first hangs while the vehicle is suspended, and then rebounds to a normal operating position when the vehicle is returned to the ground. Inadvertent rebound of the wheel in an exceptional situation and a related actuation of one of the switches T1 to T4 is harmless with respect to functioning of the tire pressure monitoring device.

What is claimed is:

1. A system for monitoring the tire pressure in wheels mounted on an automotive vehicle by measuring, comparing and evaluating the rotating speeds of individual wheels, the system including wheel speed sensors and an electronic evaluating circuit, wherein the circuit is adapted to determine correction factors for the rotating speeds of the individual wheels representative of a deviation of the respective rotating speeds from a reference quantity, and is further adapted to store the reference quantity during a learning phase, and to determine and evaluate deviations of the correction factors from the reference quantity during an identification phase in consideration of a prevailing driving situation, and is further adapted to signal a loss of tire pressure as soon as the deviations exceed a predetermined amount;

the improvement comprising:

a wheel suspension with a signaling element, provided for each wheel, the element being adapted to send a signal to the circuit to automatically trigger a resetting of memories, which comprise data acquired and stored in the learning phase, and a re-start of the learning phase of the evaluating circuit upon rebound of the wheel to a predetermined extent.

2. The system of claim 1, further comprising a switch for manually resetting the memories and re-starting the learning phase.

3. The system of claim 1, wherein the element is a sensor.

4. The system of claim 3, further comprising a switch for manually resetting the memories and re-starting the learning phase.

5. The system of claim 1, wherein the element is a switch.

6. The system of claim 5, further comprising a second switch for manually resetting the memories and re-starting the learning phase.

\* \* \* \* \*